(12) United States Patent
 Straughter et al.

(10) Patent No.: US 11,508,196 B2
(45) Date of Patent: Nov. 22, 2022

(54) INVENTORY TRACKING SCALED LOCKING CANISTER

(71) Applicants: Jamal Straughter, Corona, CA (US); Stacye Braswell, Eastvale, CA (US); Nicholas Williams, Moreno Valley, CA (US); Ronald Houston, Birmingham, AL (US)

(72) Inventors: Jamal Straughter, Corona, CA (US); Stacye Braswell, Eastvale, CA (US); Nicholas Williams, Moreno Valley, CA (US); Ronald Houston, Birmingham, AL (US)

( * ) Notice: Subject to any disclaimer, the term of this patent is extended or adjusted under 35 U.S.C. 154(b) by 278 days.

(21) Appl. No.: 17/020,802

(22) Filed: Sep. 14, 2020

(65) Prior Publication Data

US 2021/0082218 A1 Mar. 18, 2021

Related U.S. Application Data

(60) Provisional application No. 62/899,591, filed on Sep. 12, 2019.

(51) Int. Cl.
 *G07C 9/00* (2020.01)
 *B65D 1/12* (2006.01)
 (Continued)

(52) U.S. Cl.
 CPC ............ *G07C 9/00896* (2013.01); *B65D 1/12* (2013.01); *B65D 25/2811* (2013.01); *B65D 55/02* (2013.01); *G01G 19/52* (2013.01); *G01S 19/01* (2013.01); *G06Q 50/28* (2013.01); *G07C 9/00563* (2013.01); *G07C 9/37* (2020.01);
 (Continued)

(58) Field of Classification Search
 CPC .. G07C 9/00896; G07C 9/37; G07C 9/00563; G07C 2009/0092; H04W 4/029; B65D 1/12; B65D 25/2811; B65D 55/02; G01G 19/52; G01S 19/01; G06Q 50/28; G06V 40/13
 See application file for complete search history.

(56) References Cited

U.S. PATENT DOCUMENTS 10,342,737 B1 * 7/2019 Shanmugavelayudam ..................
 A61J 1/165
2010/0176917 A1 * 7/2010 Bacarella ................ E05G 1/026
 312/215

(Continued)

*Primary Examiner* — Thomas D Alunkal

(57) ABSTRACT

An inventory tracking scaled locking canister has a housing, a closure, a commodity container positioned within the housing and releasably sealed within the housing by the closure through an electrically disengageable magnetic locking mechanism, at least one weight sensor, a processing unit, a biometric sensor, a digital display, a data storage unit, a wireless communication device, a power source, and a GPS module. The commodity container may have multiple nested frames with perforations that allow smaller byproducts of the contents of the central frame to be separated from the bulk of the contents. The weight of each frame is measured individually through one or more load cells. The biometric sensor prevents unauthorized access to the commodity container. The processing unit facilitates data collection, storage, and transmittal through the wireless communication device to a remote server. The GPS module tracks the location of the canister in case of theft.

15 Claims, 8 Drawing Sheets

(51) Int. Cl.
*H04W 4/029* (2018.01)
*G06Q 50/28* (2012.01)
*G01G 19/52* (2006.01)
*G01S 19/01* (2010.01)
*B65D 25/28* (2006.01)
*B65D 55/02* (2006.01)
*G07C 9/37* (2020.01)
*G06V 40/13* (2022.01)

(52) U.S. Cl.
CPC ............ *H04W 4/029* (2018.02); *G06V 40/13* (2022.01); *G07C 2009/0092* (2013.01)

(56) References Cited

U.S. PATENT DOCUMENTS

| | | | | |
|---|---|---|---|---|
| 2015/0272825 | A1* | 10/2015 | Lim | G16H 40/67 340/5.2 |
| 2015/0274388 | A1* | 10/2015 | Gordon | E05B 65/52 340/5.55 |
| 2017/0024692 | A1* | 1/2017 | Sambrailo | G06Q 10/0833 |
| 2019/0087545 | A1* | 3/2019 | Sizer | G16H 20/13 |
| 2019/0250025 | A1* | 8/2019 | Dixon, Jr. | B65D 90/48 |
| 2020/0367549 | A1* | 11/2020 | Kamer | A24C 5/002 |

\* cited by examiner

INVENTORY TRACKING SCALED LOCKING CANISTER

The current application claims a priority to the U.S. Provisional Patent application Ser. No. 62/899,591 filed on Sep. 12, 2019. The current application is filed on Sep. 14, 2020, whereas Sep. 12, 2020 and Sep. 13, 2020 were on a weekend.

FIELD OF THE INVENTION

The present invention relates generally to transportation containers. More specifically, the present invention relates to a transportation container for tracking and monitoring its contents in transit.

BACKGROUND OF THE INVENTION

Transporting *Cannabis* can be a difficult task. Currently, containers for transporting *Cannabis* do not closely monitor the status of the stored *Cannabis*. As a result, the owner of the *Cannabis* being transported cannot tell what is happening while the *Cannabis* is being transported. This blackout of information during the transportation of *Cannabis* can be problematic as there can be discrepancies in weight between the amount of *Cannabis* before the *Cannabis* was transported and after the *Cannabis* has reached its destination. Therefore, there is a need for a container that closely monitors *Cannabis* while the *Cannabis* is being transported.

The present invention is a transportation container for monitoring *Cannabis*. The container can closely monitor the weight of *Cannabis* while the *Cannabis* is being transported. The container can additionally receive parts from a modular system, allowing the container to be used for a variety of functions. The container also has a security system and GPS tracking capabilities.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

Figure 1:
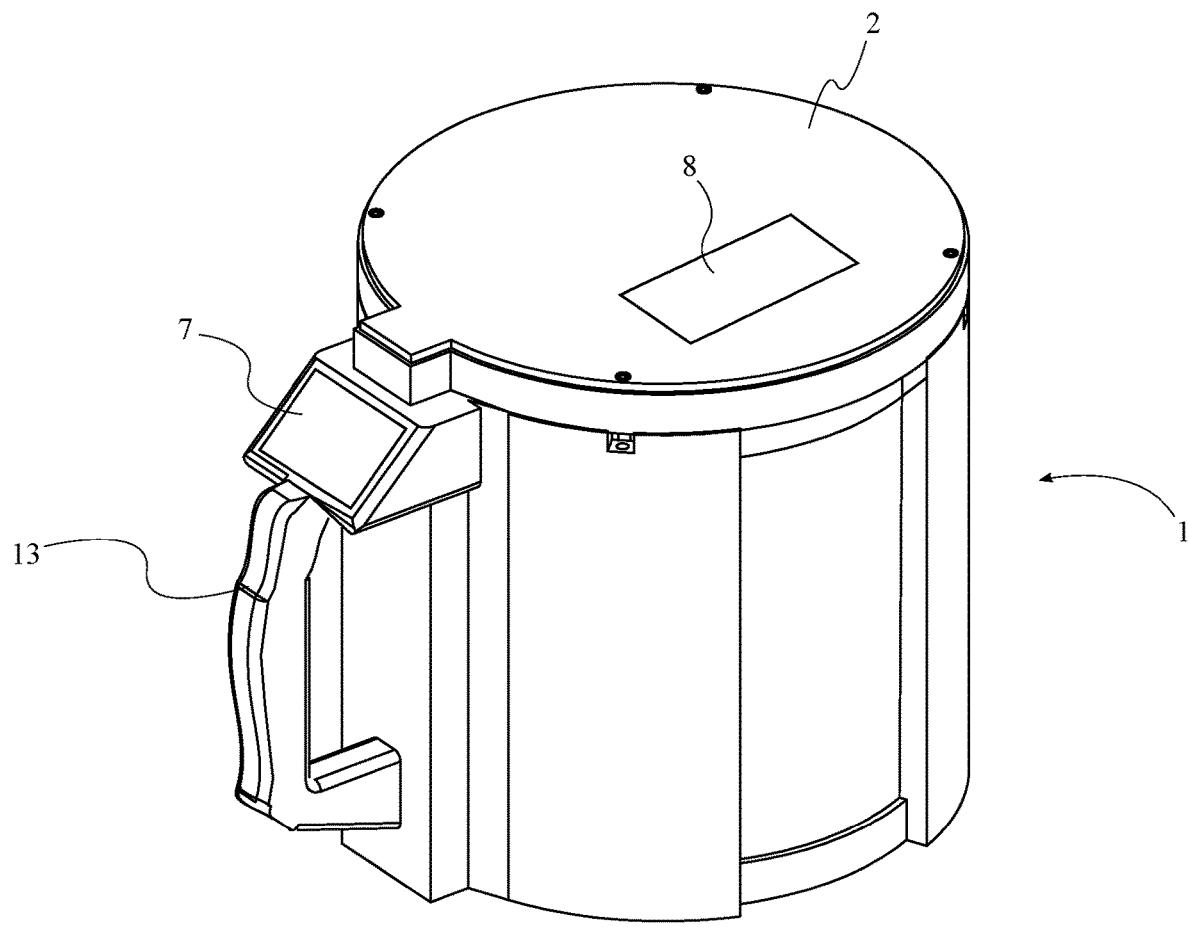
FIG. 1 is a perspective view of the SLC100 embodiment of the present invention.
Figure 2:
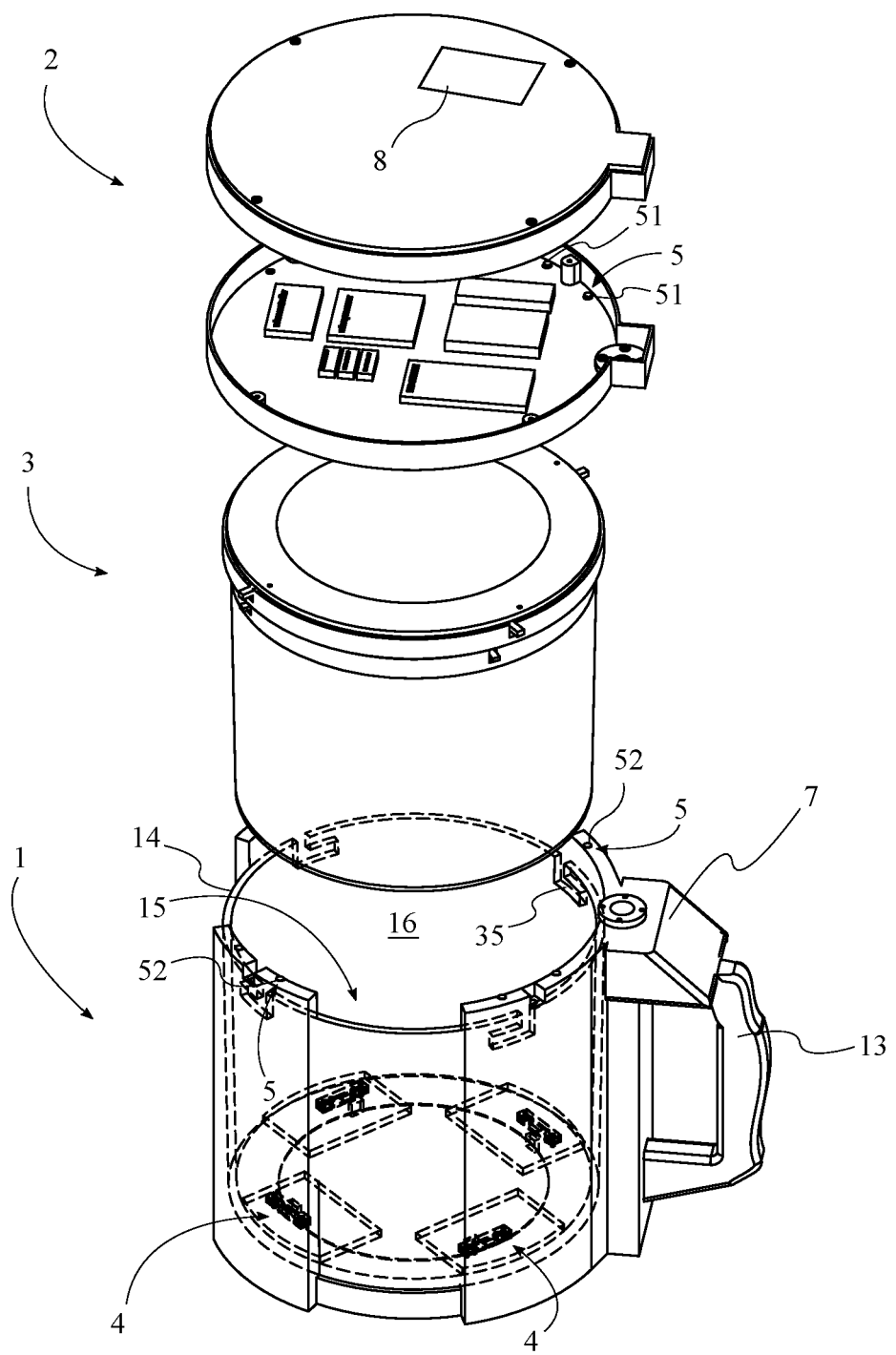
FIG. 2 is an exploded perspective view of the SLC100 embodiment.
Figure 3:
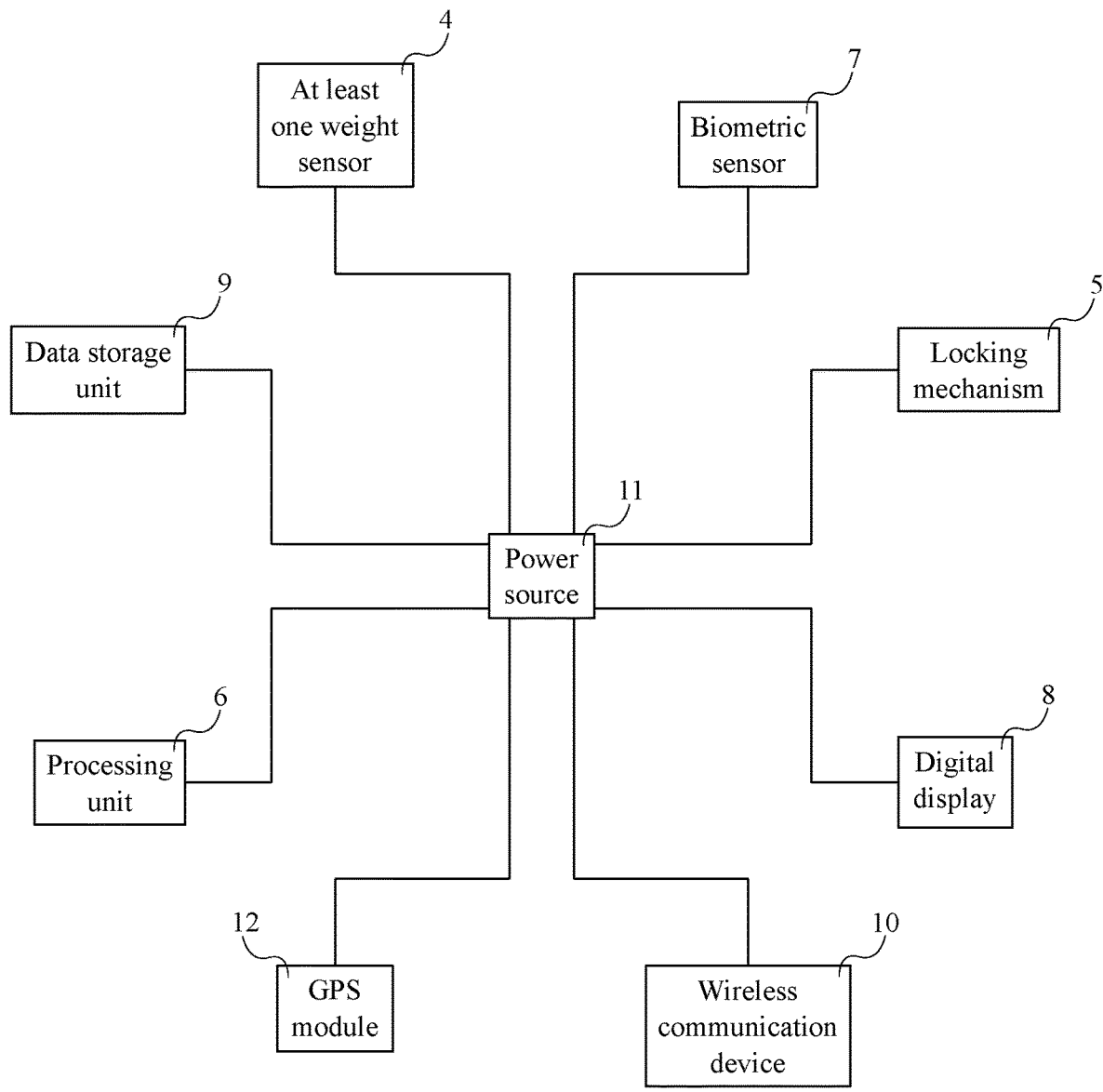
FIG. 3 is a diagram of the electrical power connections of the present invention.
Figure 4:
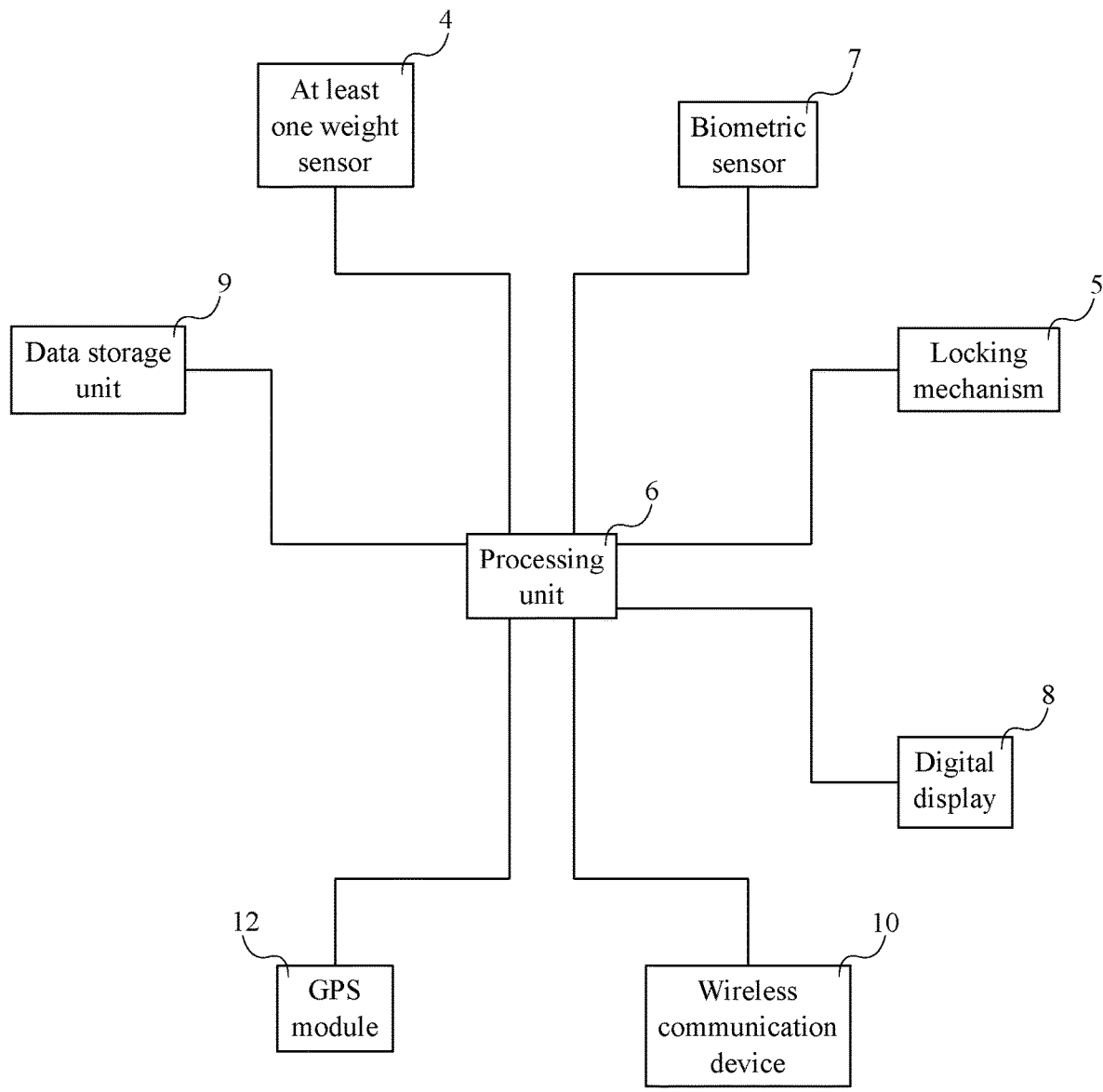
FIG. 4 is a diagram of the electronic connections of the present invention.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a container designed for monitoring and securing a quantity of a substance during transport by weighing the contents of the container and employing a locking means requiring biometric authorization to access the contents. Measurements of the weight of the contents are taken continually, at specified internals, or conditionally, such as when requested by a user, and the weight data may be displayed on a screen. Furthermore, the weight data along with access records may be transmitted wirelessly to an external computing device for review. The present invention has a modular system, allowing the present invention to perform a variety of functions. The present invention is primarily intended for use in transporting *Cannabis* product, but may be used and adapted for various other substances or purposes. In the preferred embodiment, the present invention has multiple internal concentric container frames with perforations of successively smaller sizes in order to sift different variations of *Cannabis* byproduct from the main contents being transported. However, it should be understood that the present invention is not limited to this embodiment. The present invention additionally has a security system that prevents unauthorized access to the stored contents.

The present invention may generally be referred to in some instances as a "Scaled-Locking Canister", or SLC. One embodiment of the present invention referred to as the SLC100 is intended to hold approximately 1-1.5 kilograms of material. The present invention is designed to transfer information by the monitoring of the access and displacement changes of the device within a licensed retailer to observe the following with a corresponding record:

The inventory real-time position of each batch of product within the retailer at any given moment
  Transfers between devices, such as between an SLC200 (a larger unit similar in size to an oil drum) to an SLC100
  A means of controlled access through the use of biometric identification
  The registered individuals who are authorized for access, as well as the individuals who are not
  Weight displacement of the product and its rate of decay and yields In general, referring to FIGS. 1-4, the present invention comprises a housing 1, a closure 2, a commodity container 3, at least one weight sensor 4, a locking mechanism 5, a processing unit 6, a biometric sensor 7, a digital display 8, a data storage unit 9, a wireless communication device 10, a power source 11, and a global positioning system (GPS) module 12.

The housing 1 is the main structure of the present invention which surrounds and supports the rest of the components of the present invention. The housing 1 comprises a housing body 14, a cavity 15, and an opening 16. The cavity 15 of the housing 1 is positioned within the housing body 14 and the opening 16 traverses through the housing body 14 into the cavity 15 of the housing 1. In the preferred embodiment of the present invention, the housing 1 is cylindrical, as is the cavity 15, and the opening 16 traverses axially into the cavity 15, though this is not a requirement in all embodiments. Preferably, the housing 1 is constructed of a hard material such as metal or hard plastic, such as acetal, ABS, acrylic, or polycarbonate, to limit the ability for unauthorized users to tamper with the internals of the device. Furthermore, the housing 1 may comprise one or more internal cavities aside from the aforementioned cavity 15 in order to accommodate various electronic components.

The closure 2 is attached to the housing body 14 adjacent to the opening 16, and is releasably sealed over the opening 16 through the locking mechanism 5. It may be generally understood in the preferred embodiment that the closure 2 is a lid, but this is not a requirement in all embodiments. The commodity container 3 is removably positioned within the cavity 15 of the housing 1, wherein the commodity container 3 is sealed within the cavity 15 of the housing 1 by the closure 2. During use, any commodity such as *Cannabis* product or other contents will be placed into the commodity container 3, and thus the closure 2 controls access to said contents. In general, the commodity container 3 is engaged with the at least one weight sensor 4, wherein the at least one weight sensor 4 is configured to measure the weight of the commodity container 3. The closure 2 is configured to be opened only through validation of an authorized user through the use of the biometric sensor 7, which is a fingerprint sensor in the preferred embodiment, though other biometric identification means may alternatively or additionally be utilized in various other embodiments.

In the preferred embodiment and in various other embodiments, the commodity container 3 may comprise nested containers, or frames, which serve different purposes according to their configurations, as will be discussed further hereinafter.

The processing unit 6 is electronically connected to the at least one weight sensor 4, the locking mechanism 5, the biometric sensor 7, the digital display 8, the data storage unit 9, the wireless communication device 10, and the GPS module 12.

In general, in the preferred embodiment, the processing unit 6 is configured to perform tasks such as, but not limited to: collecting a plurality of data and storing the plurality of data in the data storage unit 9, wherein the plurality of data comprises weight measurement data collected through the at least one weight sensor 4, location data collected through the GPS module 12, and user access data collected through the biometric sensor 7; transmitting the plurality of data to an external computing device through the wireless communication device 10; displaying the weight measurement data on the digital display 8; and disengaging the locking mechanism 5 if an authorized user account is validated through the biometric sensor 7.

The power source 11 is one or more battery units and is electrically connected to the at least one weight sensor 4, the locking mechanism 5, the processing unit 6, the biometric sensor 7, the digital display 8, the data storage unit 9, the wireless communication device 10, and the GPS module 12. Preferably, the power source 11 of the present invention comprises a primary rechargeable (lithium, nickel-cadmium, or nickel-metal hydride) battery to power the main functions of the present invention, such as measuring the weight of the container frames and performing biometric authorization tasks, as well as a secondary rechargeable (NiMC) battery for key functions such as powering the GPS module 12 and communicating data to a remote server through the wireless communication device 10. The power source 11 will be positioned within the housing 1 and will be required to be charged via an external charging cable such as, but not limited to, a type-C USB port.

The present invention has several different electronic components that are used to measure and calculate different variables and values. The processing unit 6 may vary in different embodiments. More particularly, the present invention comprises at least one processing unit 6. In some embodiments, the processing unit 6 comprises both a microcontroller and a microprocessor, each tasked with performing different functions. The biometric sensor 7 will communicate with the microcontroller in order to process the information regarding access protocols to determine if an individual is authorized to open the device. If the fingerprint (or other biometric identifier) is recognized, the micro controller will disengage the locking mechanism 5 and allow the closure 2 to be opened, granting access to the contents of the commodity container 3.

More specifically, in some embodiments, the microcontroller manages data input and output of the present invention to communication the direction of various pieces of data and information in regards to weight displacement, biometric identification, and locking mechanism 5 release, or any other types of embedded commands. The microcontroller also stores basic information in regard to memory of weight of the device at a given moment based on the displacement of the commodity container 3 or its subframes over a given period of time. Such information is exclusive to the device it was gathered on.

The microprocessor handles all documentation of access and weight displacement, as well as utilizing an operating software to understand how to manage different aspects of communication from the hardware of the present invention to the software of the present invention. Data exclusive to a given device will be sent to an internal hardware memory as far as time of last access and current weight displacement, in addition to recognizable fingerprints or other biometric identifier data.

The digital display 8 may be positioned in any desirable location external to the housing 1, and is used to display various data relevant to the present invention, such as, but not limited to, the weight being dispensed, the current yields of each frame, and any other relevant operating functions.

The GPS module 12 is used to maintain a means of tracking the present invention at any moment of transfer and in case of theft. As previously mentioned, the GPS has access to a secondary power source 11 as a failsafe measure; in the event the primary battery becomes depleted, the secondary battery will engage to provide power to the GPS module 12.

Figure 5:
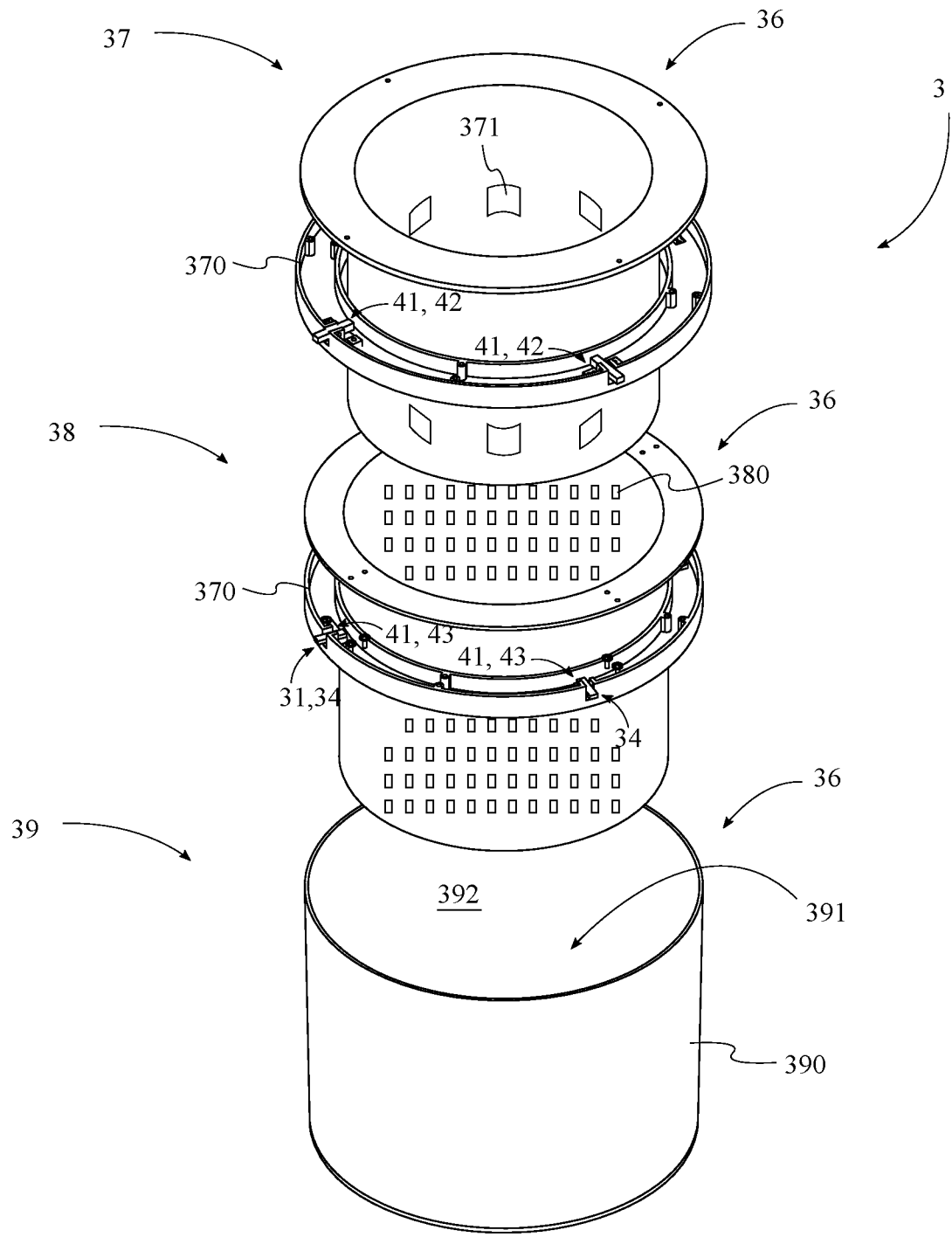
FIG. 5 is an exploded perspective view of the commodity container.
Figure 6:
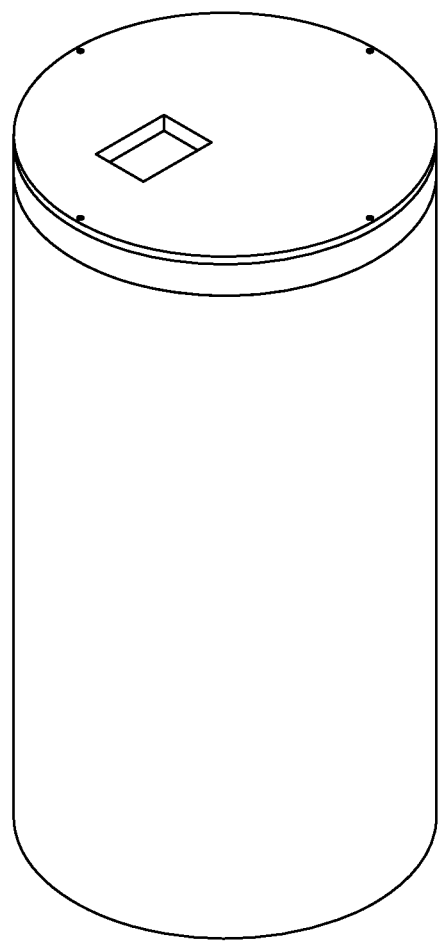
FIG. 6 is a perspective view of the SLC200 embodiment.
Figure 7:
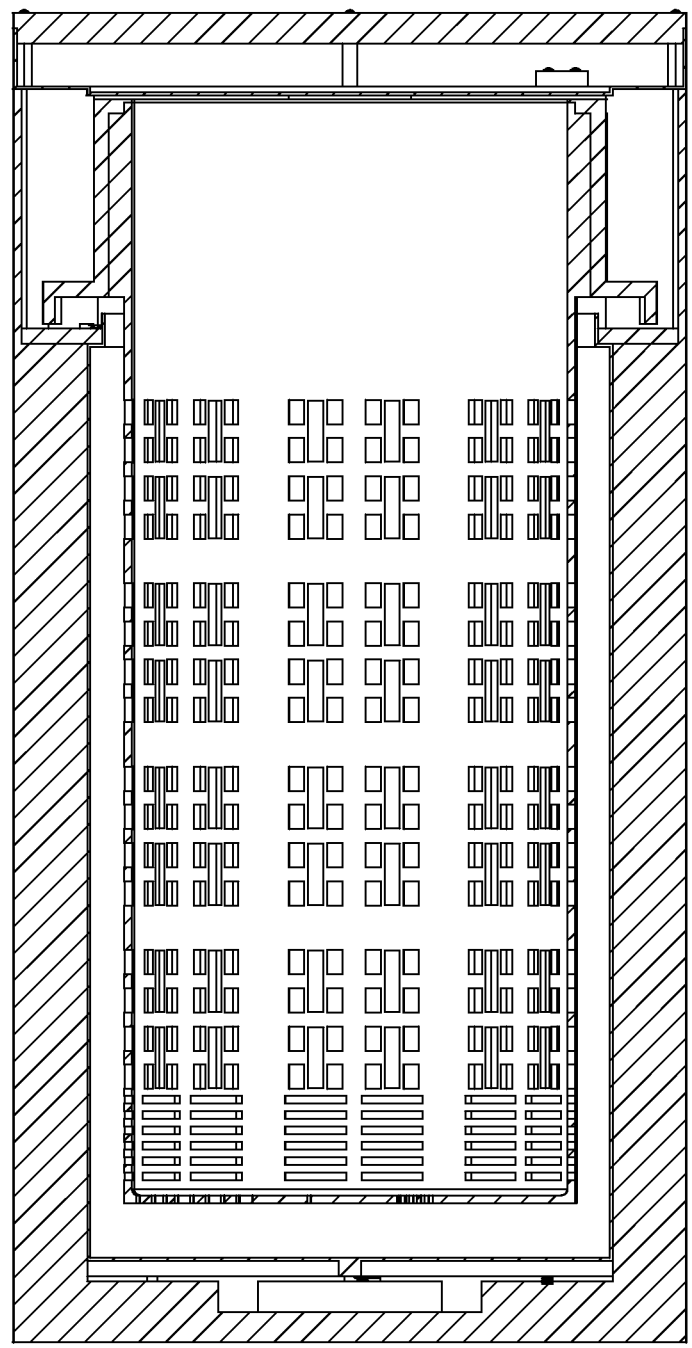
FIG. 7 is a sectional view of the SLC200 embodiment.
Figure 8:
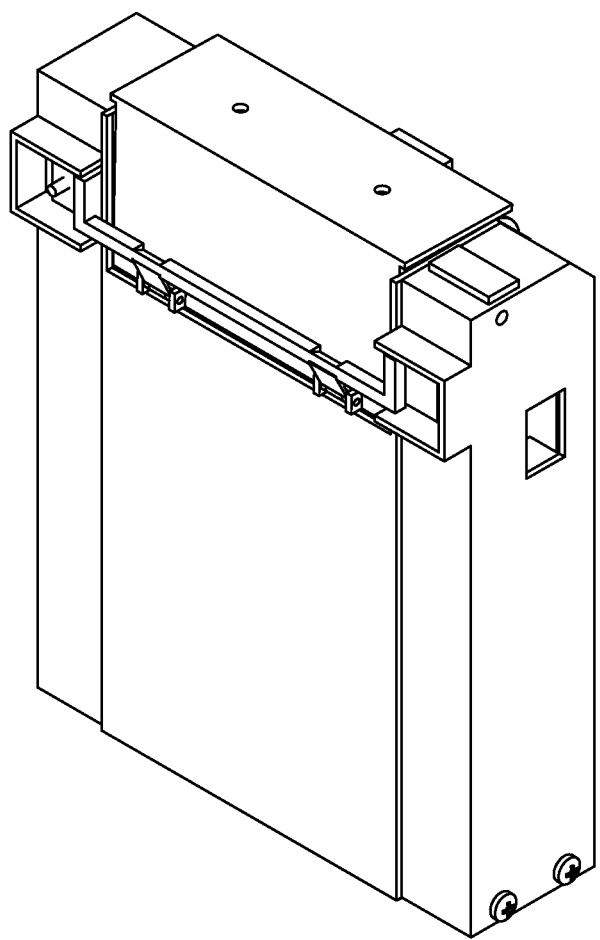
FIG. 8 is a perspective view of the SLCney embodiment.

Referring to FIG. 5, In the preferred embodiment, the commodity container 3 comprises three container frames 36, and the at least one weight sensor 4 correspondingly comprises three sets of load cells, one load cell set per container frame in order to individually weigh the contents of each container frame. Preferably, each set of load cells comprises four load cells, the measurements from which are averaged together to determine the weight of a corresponding container frame. The present invention further comprises a plurality of load cell amplifiers which amplify the voltage of the load cells and sends the amplified signals to the processing unit 6, which will calculate a mass value from the amplified load cell voltage signals, which is then stored on the data storage unit 9 and can be shown on the digital display 8.

In the preferred embodiment, the closure 2 is removably positioned concentrically with and terminally adjacent to the housing 1 over the opening 16, wherein the closure 2 is a lid. As previously mentioned, the closure 2 is secured against the opening 16 through a locking mechanism 5 controlled by the processing unit 6 based on input through the biometric sensor 7 in order to restrict access to the contents of the commodity container 3 to authorized users only.

In some embodiments, the present invention further comprises a handle 13 that is externally connected to the housing 1. Further still, in some embodiments, the biometric sensor 7 is positioned on the handle 13.

In the preferred embodiment of the present invention, the biometric sensor 7 is a fingerprint sensor, though it is contemplated that in some embodiments the biometric sensor 7 may be or comprise other sensors or means of biometric authentication, such as, but not limited to, facial recognition or retina identification.

Preferably, the biometric sensor 7 will be used to validate the following, but is not limited to:

Opening the closure 2: validation of an authorized user through the biometric sensor 7 will authorize the electrical current of the battery to be sent to the locking mechanism 5 for a period of time to allow the closure 2 to be opened.

Removing the commodity container 3 or portions thereof: the commodity container 3, and in various embodiments, subframes of the commodity container 3, will be secured by one or more magnets or solenoids that will secure the container or subframes in place atop one of the at least one weight sensor 4. In the event of the removal of the commodity container 3 or subframe thereof, the biometric sensor 7 will authorize the magnet or solenoid to be released, allowing the commodity container 3 or one of its subframes to be removed.

Authorizing and documenting a new user: when a new user, such as employee, is added to an account utilized with the present invention, a certain amount of information will be required to be input into a software utilized to interface with and manage the present invention. One such piece of information is the new user's biometric signature, such as a fingerprint, retinal scan, or biometric identifier, to give a protocol of authorization to the devices of the account. The biometric sensor 7 will be used to document an individual's biometric signature information and the protocol of authorization will be designated on the software associated with the present invention.

Confirming a shipping manifest transfer: each account of a licensee has a series of biometric identification means per each employee with a corresponding protocol as to what they are allowed access to. In the process of transfer from licensee to licensee there will be a pre-logged shipping manifest document to show the original location and the corresponding location of delivery. When a device is being transferred to the corresponding location there will be a means to allow account to account access of devices for the transfers. For instance, Licensee A is bringing a pre-logged shipment to Licensee B. The devices in transit will be tracked via RFID per batch and with a GPS module 12 to watch the delivery and ensure that it makes the destination location within the allotted time. When the device is brought to Licensee B, the biometric identification will allow a full transfer of account access to the individual when the correct biometric ID is applied to the devices. Afterward, the devices are in ownership of Licensee B.

In the preferred embodiment, the locking mechanism 5 is an electrically operated neodymium magnet locking system, or EOND. The EOND will be a fail secure lock that will be used to keep the framing system of the present invention secured to the housing 1 and to keep the internal contents isolated and secure until the proper biometric ID is applied and verified for access. If the authorization is valid, the main function battery will send a current to the magnet to eliminate the magnetic field of the magnet and allow the authorized individual access to the internals of the present invention.

More specifically, in the preferred embodiment, the locking mechanism 5 comprises a first plurality of closure magnets 51 and a second plurality of closure magnets 52. The first plurality of closure magnets 51 is connected to the closure 2, while the second plurality of closure magnets 52 is connected to the housing 1. The first plurality of closure magnets 51 and the second plurality of closure magnets 52 are releasably engaged with each other in order to releasably seal the closure 2 over the opening 16 of the housing 1. In order to control the locking mechanism 5 in this embodiment, the second plurality of magnets (and/or the first plurality of magnets, in some embodiments) is electrically connected to the power source 11, wherein the power source 11 is configured to electrically demagnetize the second plurality of magnets in order to disengage the first plurality of magnets and the second plurality of magnets from each other.

Furthermore, in the preferred embodiment, the commodity container 3 is releasably affixed within the cavity 15 of the housing 1 through a container securing mechanism 31. In some embodiments, the container securing mechanism 31 comprises a first plurality of container securing magnets 32 and a second plurality of container securing magnets 33. The first plurality of container securing magnets 32 are connected within the cavity 15 of the housing 1, while the second plurality of container securing magnets 33 are connected to the commodity container 3. Similar to the locking mechanism 5 of the closure 2, the second plurality of container securing magnets 33 is electrically connected to the power source 11, and the power source 11 is configured to disengage the container securing mechanism 31 by electrically demagnetizing the second plurality of container securing magnets 33.

Alternatively, in some embodiments, the container securing mechanism 31 comprises at least one container securing tab 34 and at least one tab receiving slot 35. Each of the at least one container securing tab 34 laterally protrudes from the commodity container 3, and the at least one container securing tab 34 is radially distributed about the commodity container 3. Each of the at least one tab receiving slot 35 laterally traverses into the housing body 14 from the internal cavity 15 of the housing 1, and the at least one tab receiving slot 35 is radially distributed about the commodity container 3. The at least one container securing tab 34 and the at least one tab receiving slot 35 are radially distributed correspondingly to each other; for example, in some embodiments, the at least one container securing tab 34 comprises four container securing tabs spaced at 90 degrees from each other, while the at least one tab receiving slot 35 comprises four tab receiving slots spaced at 90 degrees from each other. Each of the at least one container securing slot is configured to receive one of the at least one container securing tab 34 in order to secure the commodity container 3 within the cavity 15 of the housing 1. The specific geometry of the at least one securing tab and the at least one securing slot may vary, but in some embodiments, the at least one tab receiving slot 35 has a vertical channel to accommodate the commodity container 3 being initially inserted into the cavity 15 of the housing 1, and the vertical channel is connected to a horizontal channel. Thus, after a user inserts the commodity container 3 into the cavity 15 of the housing 1 and the at least one container securing tab 34 passes along the vertical channel, the user may then twist the commodity container 3 so that the at least one container securing tab 34 then traverses along the horizontal channel, and thereafter the commodity container 3 is prevented from axial upward movement relative to the cavity 15 of the housing 1. To remove the commodity container 3, the user may simply reverse the twisting action and lift the commodity container 3 out of the cavity 15 of the housing 1.

As previously mentioned, the preferred embodiment of the invention has multiple container frames 36 with successively smaller perforations in order to sift and collect different sizes of byproduct from Cannabis being transported using the present invention. To this end, the commodity container 3 comprises a plurality of container frames 36, and the at least one weight sensor 4 comprises a plurality of weight sensor sets 41. The plurality of container frames 36 are nested within each other, and each of the plurality of container frames 36 is engaged with one of the plurality of weight sensor sets 41, wherein each of the plurality of weight sensor sets 41 is configured to measure the weight of one of the plurality of container frames 36.

More particularly, in the preferred embodiment, the commodity container 3 comprises a first container frame 37, a second container frame 38, and a third container frame 39. The first container frame 37, the second container frame 38, and the third container frame 39 each comprise a frame body 390, a cavity 391, and an opening 392. In the preferred embodiment, the first container frame 37, the second container frame 38, and the third container frame 39 are each cylindrical in geometry, though this is not a strict requirement of all embodiments. Correspondingly, the at least one weight sensor 4 comprises a first set of weight sensors 42, a second set of weight sensors 43, and a third set of weight sensors 44. For each of the first container frame 37, the second container frame 38, and the third container frame 39, the cavity 391 is positioned within the frame body 390, and the opening 392 traverses into the cavity 391 so that the first container frame 37, the second container frame 38, and the third container frame 39 are each open-topped cylinders in the preferred embodiment, though this is not a strict requirement of all embodiments.

As previously mentioned, the three container frames 36 are nested within each other. Thus, the body of the first container frame 37 is removably positioned within the cavity 15 of the second container frame 38. The first set of weight sensors 42 is positioned between the first container frame 37 and the second container frame 38, wherein the first container frame 37 rests atop the first set of weight sensors 42, and wherein the first set of weight sensors 42 is configured to measure the weight of the first container frame 37.

Similarly, in the preferred embodiment, the body of the second container frame 38 is removably positioned within the cavity 15 of the third container frame 39, and the second set of weight sensors 43 are positioned between the second container frame 38 and the third container frame 39, wherein the second container frame 38 rests atop the second set of weight sensors 43, and wherein the second set of weight sensors 43 is configured to measure the weight of the second container frame 38.

Moving on, the body of the third container frame 39 is removably positioned within the cavity 15 of the housing 1, and the third set of weight sensors 44 is positioned between the third container frame 39 and the body of the housing 1, wherein the third container frame 39 rests atop the third set of weight sensors 44, and wherein the third set of weight sensors 44 is configured to measure the weight of the third container frame 39. Thus, the present invention is able to measure the weight of the contents of each of the first, second, and third container frames individually. It should be noted that the aforementioned arrangement has been explained in relation to the preferred embodiment of the present invention, it is to be understood that other arrangements may be utilized in various embodiments to the same effect.

In some embodiments, each of the three container frames 36 comprises a plurality of lateral extrusions which are configured to rest either directly atop a load cell or onto a component that is displacing the weight of the container frame to the load cell in order to register the weight.

Moreover, in the preferred embodiment, the first container frame 37 and the second container frame 38 each further comprise a rim 370. The rim 370 is connected concentrically adjacent to and around the opening 392, and extends laterally outward from the opening 392 for each of the first container frame 37 and the second container frame 38. In the preferred embodiment, the first set of weight sensors 42 is mounted between the rim 370 of the first container frame 37 and the rim 370 of the second container frame 38. A similar arrangement may be comprises for the successive container frames 36, or the second set of weight sensors 43 and the third set of weight sensors 44 may be positioned directly or indirectly underneath the second container frame 38 and the third container frame 39, respectively, or another suitable geometric arrangement may be utilized as desired and applicable.

As previously mentioned, the successive layers of container frames 36 are configured in the preferred embodiment in order to sift and collect different variations of Cannabis byproduct being transported within the present invention. To this end, the first container frame 37 further comprises a first plurality of apertures 371, while the second container frame 38 further comprises a second plurality of apertures 380. The first plurality of apertures 371 laterally traverses through the body of the first container frame 37, and the second plurality of apertures 380 laterally traverses through the body of the second container frame 38. The first container frame 37 and the second container frame 38 may be referred to in some instances as "perforated frames" while the third container frame 39 may be referred to as a "nonperforated frame." Moreover, the first container frame 37, the second frame, and the third container frame 39 may be referred to in some instances, respectively, as a product frame, a byproduct frame, and a minute byproduct frame. The product frame is designed to contain the prim 370 ary mass of Cannabis flower to be transported. In some embodiments, the first plurality of lateral apertures of the product frame may measure one centimeter square in order to allow smaller byproduct, or "shake", which may become separated from the main mass of Cannabis flower, to pass through the product frame into the byproduct frame, while keeping the main mass of Cannabis flow, including smaller "popcorn nuggets" to remain in the product frame.

As previously described, the byproduct frame surrounds the product frame, and is moreover positioned at a close distance to the product frame, with a gap of preferably approximately one millimeter. The bottom of the byproduct frame will furthermore preferably be positioned five centimeters below the bottom of the product frame. In some embodiments, the second plurality of apertures 380 traversing through the byproduct frame are one millimeter square in order to allow only minute byproduct to pass from the byproduct frame to the minute byproduct frame. The minute byproduct is composed of loose trichomes, colloquially knows as "keef", which are high THC content crystals, and can pass through the smaller perforations in the byproduct frame to be collected in the minute byproduct frame. Thus it will be apparent that when a quantity of *Cannabis* is transported between locations using the present invention, the contents of the commodity container 3 will be jostled to a certain extent, causing a certain amount of byproduct to pass from the product frame to the byproduct frame and a certain amount of minute byproduct to pass from the byproduct frame to the minute byproduct frame. These amounts of byproduct and minute byproduct are weighed and tracked individually throughout the use of the present invention.

As the commodity container 3 and its subframes, as applicable in different embodiments, are removably from the housing 1, alternate configurations of framing assemblies may be utilized in their stead. One example of such an alternate framing assembly is a sifting frame which used a small motor or a series of EOND magnets to rotate a perforated frame on an internal track at a certain angle, such as, but not limited to, 30 degrees, in order to sift the marijuana byproduct from the product frame to measure a more accurate byproduct yield without distorting the load cell holding the frame in place. Another alternate framing assembly is an LED frame, which utilizes LED light positioned around the frame's internal rim 370 to illuminate the product contained within for presentation purposes while still utilizing all the same access and displacement data. Another example of an alternate framing assembly is a collection bag frame. For context, collection of the minute byproduct can be somewhat difficult, as its form is that of a small resinous powder. By using a thick opaque polymer as a bag that is attached to the minute byproduct frame as opposed to a non-perforated frame, a user may isolate, collect, and remove the minute byproduct with expedience will still being able to calculate the exact amount collected.

As previously mentioned, another embodiment of the present invention may be referred to as the SLC200 embodiment. The SLC200 is designed to transfer information regarding the user access and displacement changes within a marijuana growing facility and as a means to document all access from transfers among distributors. The SLC200 is intended to be used as a storage system for each individual plant's yield. The construction and functionality of the SLC200 is generally the same as the SLC100, with the exception that the SLC200 may additionally incorporate a user input device such as a keyboard and mouse, touchscreen or other device in order to document various information as required. The commodity container 3's framing assembly differs slightly from the SLC100 in that the SLC200 has a single perforated frame and a single non-perforated frame, which may take the form of a polymer bag.

A third specific embodiment of the present invention known as the SLCnev is a personalized device designed to be used as a checkpoint system from a retailer to a consumer. The SLCnev is the most small and compact of the three embodiments, being designed exclusively for personal, individual use. The SLCnev is similar to the SLC embodiments in regard to function, however the data collected from the SLCnev may be utilized to understand more ambiguous questions such as consumption rate and intoxication level according to access displacement cross examination with the individual's personal information.

Intoxication Cross examination method w/SLCnev: The SLCnev allows a new variable that can be calculated only with the SLCnev, which corresponds to the rate of consumption of the user.

$$\text{Amount Consumed}(g)/\text{Given Time(time)}=\text{Rate of Consumption}(\lambda).$$

With a given rate of consumption one can see a base level amount of THC that would reside in the blood at any given moment with an algorithm that could properly cross-examine the weight, height, and fat content of an individual. With the individual's information and rate of consumption, one can calculate a base level amount of $\Delta$ (THC) that would be present in that individual ($\Omega$).

Finally, with the ($\Omega$) one can use that as the standard of an individual's intoxication level according to what should be present in their body given their consumption rate. Any spike above what the ($\Omega$) level's average is would show some form of intoxication on part of the user. The SLCnev may be different in shape than the SLC series, being generally rectangular as opposed to cylindrical. Moreover, the SLCnev utilizes only one non-perforated frame that rests atop a single micro load cell within the housing 1. The frame is intended to only be removed if it is necessary to change or perform maintenance on the device's components.

Although the invention has been explained in relation to its preferred embodiment, it is to be understood that many other possible modifications and variations can be made without departing from the spirit and scope of the invention as hereinafter claimed.

What is claimed is:

1. An inventory tracking scaled locking canister comprising:
   a housing;
   a closure;
   a commodity container;
   at least one weight sensor;
   a locking mechanism;
   a processing unit;
   a biometric sensor;
   a digital display;
   a data storage unit;
   a wireless communication device;
   a power source;
   a GPS module;
   the housing comprising a housing body, a cavity, and an opening;
   the cavity of the housing being positioned within the housing body;
   the opening traversing through the housing body into the cavity of the housing;
   the closure being attached to the housing body adjacent to the opening;
   the closure being releasably sealed over the opening through the locking mechanism;
   the commodity container being removably positioned within the cavity of the housing, wherein the commodity container is sealed within the cavity of the housing by the closure;
   the commodity container being engaged with the at least one weight sensor, wherein the at least one weight sensor is configured to measure the weight of the commodity container;
   the power source being electrically connected to the at least one weight sensor, the locking mechanism, the processing unit, the biometric sensor, the digital display, the data storage unit, the wireless communication device, and the GPS module; and the processing unit being electronically connected to the at least one weight sensor, the locking mechanism, the biometric sensor, the digital display, the data storage unit, the wireless communication device, and the GPS module.

2. The inventory tracking scaled locking canister as claimed in claim 1, wherein the processing unit is configured to:

collect a plurality of data and store the plurality of data in the data storage unit, wherein the plurality of data comprises weight measurement data collected through the at least one weight sensor, location data collected through the GPS module, and user access data collected through the biometric sensor;

transmit the plurality of data to an external computing device through the wireless communication device;

display the weight measurement data on the digital display; and disengage the locking mechanism if an authorized user account is validated through the biometric sensor.

3. The inventory tracking scaled locking canister as claimed in claim 1 comprising:

the closure being removably positioned concentrically with and terminally adjacent to the housing over the opening, wherein the closure is a lid.

4. The inventory tracking scaled locking canister as claimed in claim 1 comprising:

the locking mechanism comprising a first plurality of closure magnets and a second plurality of closure magnets;

the first plurality of closure magnets being connected to the closure;

the second plurality of closure magnets being connected to the housing; and the first plurality of closure magnets and the second plurality of closure magnets being releasably engaged with each other in order to releasably seal the closure over the opening of the housing.

5. The inventory tracking scaled locking canister as claimed in claim 4 comprising:

the second plurality of magnets being electrically connected to the power source, wherein the power source is configured to electrically demagnetize the second plurality of magnets in order to disengage the first plurality of magnets and the second plurality of magnets from each other.

6. The inventory tracking scaled locking canister as claimed in claim 1 comprising:

the commodity container being affixed within the cavity of the housing through a container securing mechanism.

7. The inventory tracking scaled locking canister as claimed in claim 6 comprising:

the container securing mechanism comprising a first plurality of container securing magnets and a second plurality of container securing magnets;

the first plurality of container securing magnets being connected within the cavity of the housing;

the second plurality of container securing magnets being connected to the commodity container;

the second plurality of container securing magnets being electrically connected to the power source; and the processing unit being configured to disengage the container securing mechanism by electrically demagnetizing the second plurality of container securing magnets.

8. The inventory tracking scaled locking canister as claimed in claim 6 comprising:

the container securing mechanism comprising at least one container securing tab and at least one tab receiving slot;

each of the at least one container securing tab laterally protruding from the commodity container;

the at least one container securing tab being radially distributed about the commodity container;

each of the at least one tab receiving slot laterally traversing into the housing body from the internal cavity of the housing;

the at least one tab receiving slot being radially distributed about the commodity container;

the at least one container securing tab and the at least one tab receiving slot being radially distributed correspondingly to each other; and each of the at least one container securing slot being configured to receive one of the at least one container securing tab.

9. The inventory tracking scaled locking canister as claimed in claim 1 comprising:

a handle; and the handle being externally connected to the housing.

10. The inventory tracking scaled locking canister as claimed in claim 9 comprising:

the biometric sensor being positioned on the handle.

11. The inventory tracking scaled locking canister as claimed in claim 1 comprising:

the biometric sensor being a fingerprint sensor.

12. The inventory tracking scaled locking canister as claimed in claim 1 comprising:

the commodity container comprising a plurality of container frames;

the at least one weight sensor comprising a plurality of weight sensor sets;

the plurality of container frames being nested within each other; and each of the plurality of container frames being engaged with one of the plurality of weight sensor sets, wherein each of the plurality of weight sensor sets is configured to measure the weight of one of the plurality of container frames.

13. The inventory tracking scaled locking canister as claimed in claim 1 comprising:

the commodity container comprising a first container frame, a second container frame, and a third container frame;

the first container frame, the second container frame, and the third container frame each comprising a frame body, a cavity, and an opening;

the at least one weight sensor comprising a first set of weight sensors, a second set of weight sensors, and a third set of weight sensors;

the cavity being positioned within the frame body for each of the first container frame, the second container frame, and the third container frame;

the opening traversing into the cavity for each of the first container frame, the second container frame, and the third container frame;

the body of the first container frame being removably positioned within the cavity of the second container frame;

the first set of weight sensors being positioned between the first container frame and the second container frame, wherein the first container frame rests atop the first set of weight sensors, and wherein the first set of weight sensors is configured to measure the weight of the first container frame;

the body of the second container frame being removably positioned within the cavity of the third container frame;

the second set of weight sensors being positioned between the second container frame and the third container frame, wherein the second container frame rests atop the second set of weight sensors, and wherein the second set of weight sensors is configured to measure the weight of the second container frame;

the body of the third container frame being removably positioned within the cavity of the housing; and the third set of weight sensors being positioned between the third container frame and the body of the housing, wherein the third container frame rests atop the third set of weight sensors, and wherein the third set of weight sensors is configured to measure the weight of the third container frame.

14. The inventory tracking scaled locking canister as claimed in claim 13 comprising:

the first container frame and the second container frame each further comprising a rim;

the rim being connected concentrically adjacent to and around the opening and extending laterally outward from the opening for each of the first container frame and the second container frame; and the first set of weight sensors being mounted between the rim of the first container frame and the rim of the second container frame.

15. The inventory tracking scaled locking canister as claimed in claim 13 comprising:

the first container frame further comprising a first plurality of apertures;

the second container frame further comprising a second plurality of apertures;

the first plurality of apertures laterally traversing through the body of the first container frame; and the second plurality of apertures laterally traversing through the body of the second container frame.

* * * * *